Aug. 14, 1951  W. P. EDEN  2,564,156
SLOTTER FOR TEMPLATES AND THE LIKE
Filed May 20, 1946  2 Sheets-Sheet 1
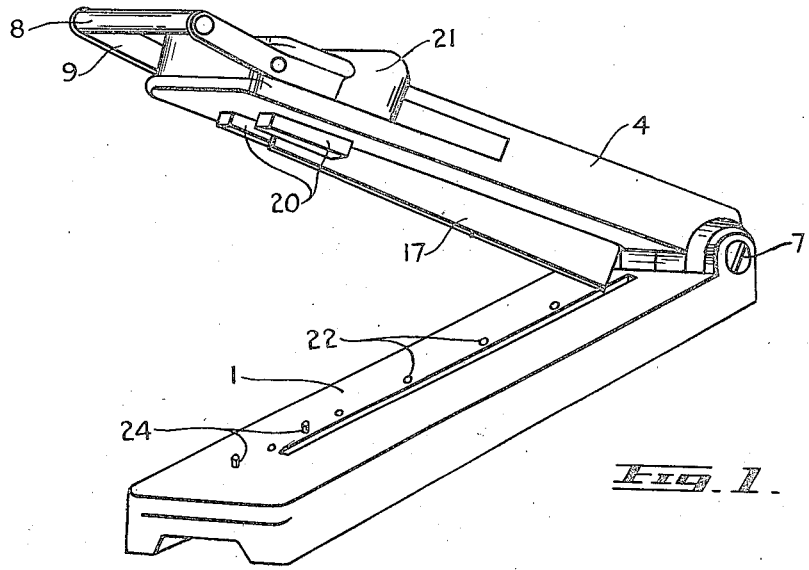
Fig. 1.
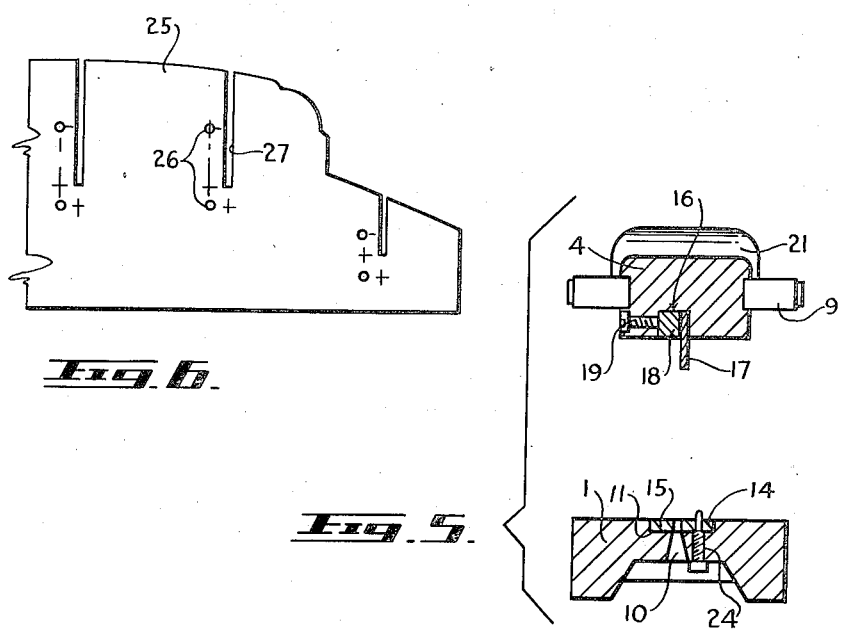
Fig. 6.
Fig. 5.
Inventor
WILLIAM P. EDEN
Attorney

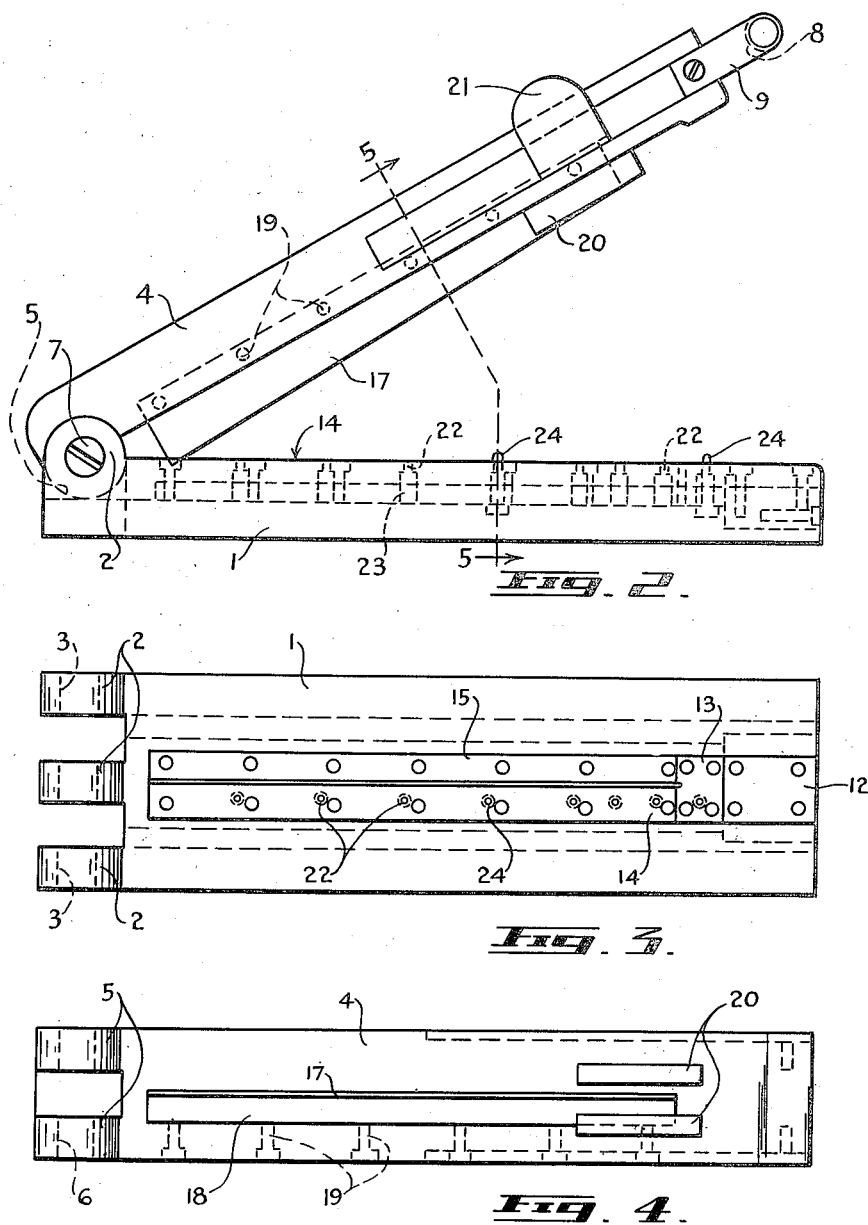

Patented Aug. 14, 1951

2,564,156

UNITED STATES PATENT OFFICE 2,564,156

SLOTTER FOR TEMPLATES AND THE LIKE

William Paul Eden, Fort William, Ontario, Canada

Application May 20, 1946, Serial No. 670,957

2 Claims. (Cl. 164—41)

This present invention relates to improvements in a slotting device for a template or the like and appertains generally to an apparatus of the type for punching, cutting, perforating or slotting relatively thin stock such as sheets or plates wherein the work may be located simply, rapidly and accurately with respect to the cutting dies.

An object of the invention is to provide an apparatus of this kind having novel work locating and/or holding means that is readily adjustable with respect to the cutting dies of the apparatus.

A further object of the invention is to provide a punching or slotting type of machine having cooperating male and female dies and provided with adjustably spaced, work locating means placed in predetermined relation to said dies.

A still further and specific object of the invention is the provision of a template slotting machine designed to cut slots of varying lengths in egg-crate type contour templates with speed and such accuracy and uniformity, due to the locating of the work by fitting perforations therein to adjustably placed pins at predetermined points on the slotter, that corresponding parts are not only freely interchangeable but the rigidity of the resulting close tolerance assembly such that bracing, tie rods, welding or soldering are alike unnecessary.

A still further object of the invention is the provision of an apparatus of the nature and for the purposes described that is characterized by structural simplicity, durability and efficiency and being capable of manufacture and use at reasonable cost is thereby rendered commercially desirable.

To the accomplishment of these and related objects as shall become apparent as the description proceeds, the invention resides in the construction, combination and arrangement of parts as hereinafter more fully described illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a perspective view of a possible embodiment of my invention;

Figure 2 is a side elevation of a specific template slotting adaptation thereof;

Figure 3 is a plan view of the base or lower jaw with its laterally spaced, companion female cutting dies;

Figure 4 is a similar plan view of the underside of the upper jaw with its depending male die or blade;

Figure 5 is a transverse section as taken along line 5—5 of Figure 2, looking in the direction indicated by the arrows; and Figure 6 is a plan of a portion of an egg-crate type contour template slotted on the herein-disclosed machine, showing the relation of the variously spaced work-locating perforations to the slots.

While my invention may assume many shapes and forms and is useable on various kinds of punching machines, it is here shown and described in connection with a single particular application viz., a slotting machine for egg-crate type templates such as are commonly used in aircraft construction in which it has proved itself most useful in the production of a superior article with a substantial saving in man hours, but I desire to point out that my invention nor the claims thereto are to be regarded as so limited.

The presently disclosed apparatus consists of a base or lower jaw 1 suitable for mounting on a table or work bench and provided with a spaced trio of hinge trunnions 2 rising from the rear end thereof with an axially aligned transverse bore 3 passing through each. A companion upper jaw 4, of substantially the same length but only about ⅔ of the width of the lower jaw 1, is similarly provided on its rear end with a spaced pair of depending hinge trunnions 5 each with a corresponding transverse bore 6. These jaws are connected in hinged relation by a hinge pin assembly 7. A handle 8 occurs across the forward end of the upper jaw 4, being supported therefrom by the spaced bracket arms 9.

A central elongated vertically flared passageway 10 runs nearly the full length of the base or lower jaw 1 and a substantially wider, shallow trough 11 straddles the top thereof and continues forwardly to the front end. Lying in this trough 11 from front to back are a front plate 12, a cropping die 13 and from the latter to the rear of the trough and spaced laterally to be along opposite sides of the vertical passageway 10 are a companion pair of female dies 14 and 15. Later reference will be made to the former of these female dies.

The upper jaw 4 has a longitudinally elongated rectangular slot 16 in the under face thereof registering generally with the lower jaw passageway 10 but rather to one side of centre and in it are secured a longitudinally tapering double edge knife or male cutting die 17 and a vise block 18 held by a plurality of screws 19 threaded through the right side of the said upper jaw 4. Spaced one on either side of this male die 17 near its forward end are a pair of resilient ejector pads 20 while overlying the upper jaw 4 approximately above the pads is a pressure cushion 21 intended to be engaged by the drop hammer of a hydraulic press.

Referring particularly to Figures 2 and 3 it will be seen that the female cutting die 14 has a row of spaced perforations 22 off from and paralleling its cutting edge and that such spacing in some cases is fractional. Furthermore in registry with each perforation 22 the base 1 has a coaxial threaded bore 23 of greater diameter and for selective insertion in predetermined perforations through which they are designed to rise, I provide a plurality of pins 24 with reduced heads and larger threaded bases that can be removably screwed into the threaded bores 23.

In making interlocking contour templates, the blank 25, such as seen in Figure 6, has carefully spotted holes 26 drilled therein and these, it will be noted, have longitudinal spacings corresponding with distances between certain of the pin receiving perforations 22 in the slotter's female die 14. Thus a pair of pins 24 can be located in a selected pair of perforations 22 in the predetermined relation to the cutting dies to cut the slots 27 on the line and to the exact length desired with ease and speed and an accuracy and uniformity not heretofore possible. Furthermore the removal and relocating of the pins is simple and fast.

From the foregoing description taken in connection with the accompanying drawings, it will be manifest that a slotter for template and the like is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described my invention, what I claim as new and desire to secure by Letters Patent is:

1. In an apparatus for slotting relatively thin stock such as cards, sheets, plates and the like, a pair of relatively moveable jaws, an elongated pair of laterally separated female dies on one of said jaws and a correspondingly elongated double-edged male shearing die on the other of said jaws, a row of perforations in one of said female dies paralleling the cutting edge thereof, some of said perforations being equally and some fractionally spaced, a concentric and threaded bore of greater diameter in the carrying jaw coaxial with each of said perforations and threaded pins removably inserted in selected bores having reduced work-locating heads rising through the aligned perforations in said female die.

2. In an apparatus for slotting relatively thin stock such as cards, sheets, plates and the like, a pair of relatively movable jaws, a central elongated vertically flared passage in the lower of said jaws with a substantially wider shallow trough straddling the top thereof and continuing forward to the front end of said jaw, a front plate, a cropping die and a laterally spaced companion pair of female dies lying in said shallow trough and in that order from front to rear of said jaw and a correspondingly elongated double-edged male shearing die on the other of said jaws, a row of perforations in at least one of said dies paralleling the cutting edge thereof, some of said perforations being equally and some fractionally spaced, a concentric and threaded bore of greater diameter in the carrying jaw coaxial with each of said perforations and threaded pins removably inserted in selected bores having reduced work-locating heads rising through the aligned perforations in said female die.

WILLIAM PAUL EDEN.

REFERENCES CITED

The following references are of record in the file of this patent:

UNITED STATES PATENTS

| Number | Name | Date |
|---|---|---|
| 1,002,296 | McPike et al. | Sept. 5, 1911 |
| 1,398,202 | Scarborough | Nov. 22, 1921 |
| 1,462,871 | Rosenberg | July 24, 1923 |
| 1,746,258 | Jacobson | Feb. 11, 1930 |
| 2,073,040 | Wood | Mar. 9, 1937 |
| 2,101,458 | Sachtleben | Dec. 7, 1937 |